US007085921B2

United States Patent
Frye, Jr.

(10) Patent No.: US 7,085,921 B2
(45) Date of Patent: Aug. 1, 2006

(54) EMBEDDED OS PXE SERVER (75) Inventor: James F. Frye, Jr., Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 651 days.

(21) Appl. No.: 10/039,049

(22) Filed: Dec. 31, 2001

(65) Prior Publication Data

US 2003/0126426 A1 Jul. 3, 2003

(51) Int. Cl.
*G06F 15/16* (2006.01)

(52) U.S. Cl. ............................. 713/1; 713/2; 713/100; 709/219; 709/222; 709/238

(58) Field of Classification Search .................... 713/1, 713/2, 100; 709/219, 222, 238
See application file for complete search history.

(56) References Cited

U.S. PATENT DOCUMENTS

| | | | |
|---|---|---|---|
| 5,680,547 A | 10/1997 | Chang | |
| 5,870,554 A | 2/1999 | Grossman et al. | |
| 6,314,455 B1* | 11/2001 | Cromer et al. | 709/217 |
| 6,487,601 B1* | 11/2002 | Hubacher et al. | 709/229 |
| 6,539,473 B1 | 3/2003 | Hubacher et al. | |
| 6,601,096 B1* | 7/2003 | Lassiter, Jr. | 709/222 |
| 6,687,820 B1 | 2/2004 | French et al. | |
| 6,711,688 B1 | 3/2004 | Hubacher et al. | |
| 6,728,875 B1* | 4/2004 | Aguilar et al. | 713/2 |
| 6,735,692 B1* | 5/2004 | Murphrey et al. | 713/1 |
| 6,748,525 B1 | 6/2004 | Hubacher et al. | |
| 6,810,478 B1* | 10/2004 | Anand et al. | 713/2 |
| 2002/0161868 A1* | 10/2002 | Paul et al. | 709/221 |
| 2003/0005096 A1* | 1/2003 | Paul et al. | 709/222 |

OTHER PUBLICATIONS

James F. Frye, Jr., U.S. Appl. No. 09/967,615, entitled, "PXE Server Applicance," filed Sep. 29, 2001, pp. 1-17, FIGS. 1A-3.
Network Computing, "Make Your Boots Shine with PXE," http://www.networkcomputing.com/columnists/1101colron.html; Jan. 24, 2000, pp. 1-4.
Network Computing, Inside Intel's "Wired for Management," http://www.networkcomputing.com/1020/1020ws1.html, Oct. 4, 1999, pp. 1-5.

(Continued)

*Primary Examiner*—A. Elamin (57) ABSTRACT

A method of directing a computer network for booting using a prebooting execution environment (PXE) embedded OS based computer is provided in which the embedded OS based computer listens for PXE requests from PXE enabled target servers of the network and in response provides a netboot program and address information of a boot server. An embodiment of an embedded OS based computer is provided that has a network interface controller, a microcontroller, a display, an input device, and a processor. An embodiment of a system for booting a computer network using the embedded OS based computer is provided. The system has a target network of PXE enabled servers coupled to the embedded OS based computer and a boot server coupled to the embedded OS based computer and to the network. The system and the method are illustrated using Windows CE operating system as an example an embedded OS.

44 Claims, 5 Drawing Sheets

OTHER PUBLICATIONS

Network Computing, Inside Intel's "Wired for Management," http://www.networkcomputing.com/1020/1020ws12.html, Oct. 4, 1999, pp. 1-3.

Compaq Computer Corporation, "Setting Up a Pre-Execution Environment (PXE) on Compaq ProLiant Servers," Nov. 2000, pp. 1-8.

Intel Corporation, "Preboot Execution Environment (PXE) Specification, Version 2.1," Sep. 20, 1999, cover pages and pp. 1-101.

Wikipedia, The Free Encyclopedia, definition for "embedded operating system," http:\\en.wikipedia.org/wiki/embedded_operating_system. p. 1 (Dec. 2004).

* cited by examiner

EMBEDDED OS PXE SERVER

CROSS-REFERENCE TO RELATED APPLICATIONS

This application is related to U.S. application Ser. No. 09/967,615, entitled "PXE Server Appliance," by James F. Frye, Jr., filed on Sep. 29, 2001, now abandoned, which is incorporated herein in its entirety for reference.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention generally relates to computer networks and more particularly to booting computer server networks.

2. Description of the Related Art

A variety of computing systems could be used for providing the server functionality on each subnet using Preboot Execution Environment (PXE) protocol and software services (developed by the Intel Corporation of Santa Clara, Calif.). This PXE software is a part of Intelts Wired for Management (WfM) program for remote booting of servers. (Preboot Execution Environment Specification, Intel Corporation, Version 2.1, Sep. 20, 1999, incorporated by reference herein). For example, a general purpose server computer could be used, but that could essentially be an overkill, as it results in an expensive general purpose server dedicated to each subnet and possibly not being used to its full extent to provide other services. Conversely, a dedicated appliance level computer could be designed as described in co-pending U.S. application Ser. No. 09/967,6 15, entitled, "PXE Server Appliance," having U.S. Patent Application Publication No. 2003/0097553. incorporated herein in its entirety. This approach results in the design, development and manufacturing cost of a specific piece of hardware dedicated to this particular task.

BRIEF SUMMARY OF THE INVENTION

According to the invention, an embedded OS based computer is employed on each subnet as the PXE server. For illustrative purposes, the Windows™ CE is selected as one such embedded OS, and the illustrative examples using the Windows CE OS should considered to include embodiments having any embedded OS. Generally, a Windows CE based computer is not thought of as a server level product, as it has limited capabilities and capacities. By using a Windows CE based computer, low cost, off-the-shelf hardware is employed while at the same time reducing the cost and development to that of developing the appropriate software to act as a PXE server for routing the PXE requests. This low cost, off-the-shelf hardware with the specialized software is then employed in the dedicated task of acting as the PXE server for each subnet. The Windows CE based computer booting system allows editing boot scripts and other adjustments to control the booting parameters at the server site rather than at the site where Internet access is available. Additionally, the Windows CE based computer can be adapted to use wireless technology to communicate with the servers, thus providing capability to utilize Internet and/or wireless communication technologies to boot the servers. Thus, in large networks having multiple subnetworks, one can advantageously use a mix of the Windows CE based computer PXE servers and the PXE server appliances of the co-pending application to suit the different requirements of the different subnetworks.

A method of directing a computer network for booting using a Windows CE based computer is provided in which the computer listens for PXE requests from PXE enabled target servers of the network and in response provides a netboot program and address information of a boot server. By executing the netboot program, the target server acquires the boot server from which the server receives a boot image and other software necessary for it to become operational. The Windows CE based computer may communicate with the target servers and the boot server via the Internet, using wireless communication, or through other techniques. An embodiment of a Windows CE based computer is provided that includes a micro computer having a network interface controller, a display, a user input device, and a processor. An embodiment of a system for booting a computer network using the Windows CE based computer is provided. The system includes a target network of PXE enabled servers coupled to the Windows CE based computer and a boot server coupled to the Windows CE based computer and to the network.

This approach can provide multiple advantages. A PXE server need not be provided on every subnet. An inexpensive Windows CE based computer instead is provided on some or all of the subnet.

BRIEF DESCRIPTION OF THE SEVERAL VIEWS OF THE DRAWINGS

A better understanding of the present invention can be obtained when the following detailed description of some embodiments is considered in conjunction with the following drawings in which.

DETAILED DESCRIPTION OF THE INVENTION

Figure 1A:
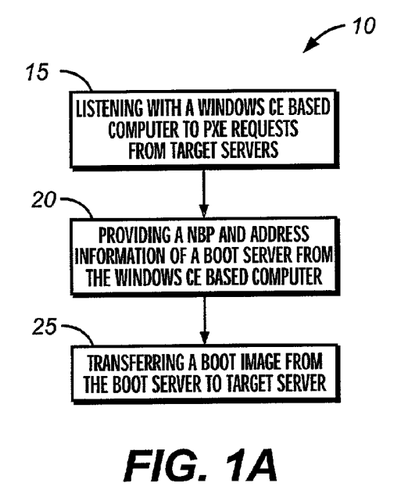
FIG. 1A is a flowchart of a technique of booting servers on a network using a Windows CE based computer according to an embodiment of the invention.
Figure 1B:
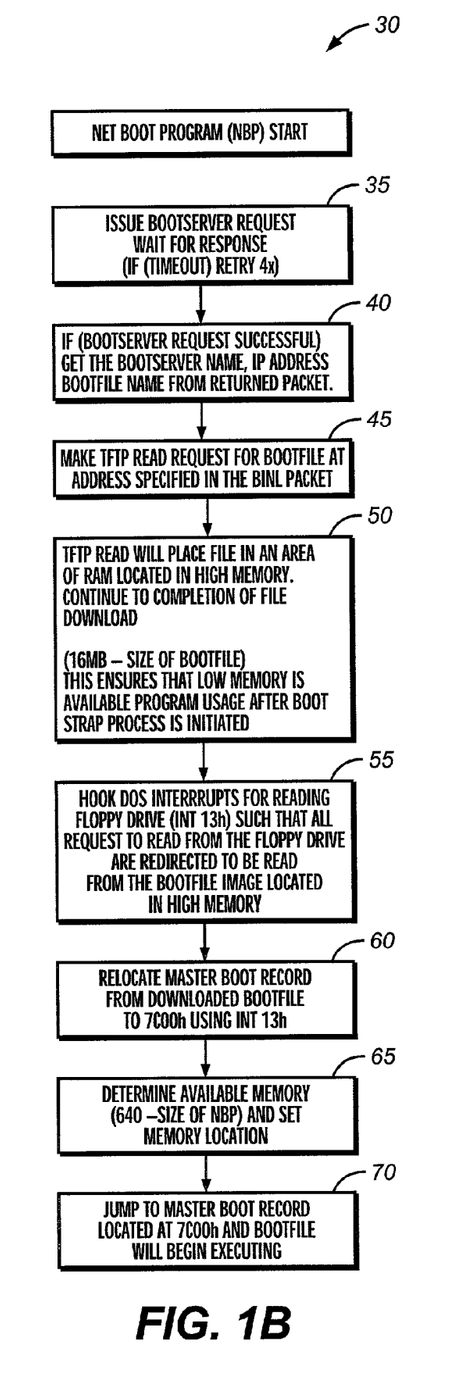
FIG. 1B is a flowchart of an example net boot program for using with a Windows CE based computer according to an embodiment of the invention.

In the following discussion it is assumed that the subject matter generally relates to an embedded OS based computer and that a Windows CE based computer is used only as an illustrative example. With reference to FIGS. 1A–1B, an example embodiment of a technique 10 of directing a computer network 115 (FIG. 2) for booting using a prebooting execution environment (PXE) Windows CE based computer 120 is illustrated. A network 115 of target servers may comprise several of subnetworks 112, 114. The number of target servers in each subnetwork is decided by each installation. A Windows CE based computer 120 is preferably coupled to each subnetwork 112, 114. Each target server utilizing the technique 10 has its PXE enable option turned on. The Windows CE based computers 120 and the network 115 form a local network where local broadcasts may be utilized for communication between the target servers and the Windows CE based computer 120. When target server booting is desired, the target server broadcasts a PXE request over the local subnetwork. In step 15 of the technique 10, the Windows CE based computer 120 listens to PXE requests from the target servers of the network 115 (FIG. 1A). In the illustrated embodiment, at least one Windows CE based computer 120 listens to one of the subnetworks 114 or 112. The listening step 15 of the technique 10 is preferably performed through a TCP/IP (the Transmission Control Protocol/Internet Protocol) stack although other techniques can be used. The TCP/IP is the most common used transmission control protocol over the Internet. The listening step 15 of the technique 10 can also be performed by wireless communication. The long range wireless communication, using a hand held computer like the Windows CE based computer 120, can be established, for example, using IEEE Std. 802.11b wherein a Media Access Control (MAC) services protocol is utilized. The short range wireless communication can be established, for example, using Bluetooth industry standard (an Intel standard). The Bluetooth devices provide an effective range of up to 32 feet and operate at 24 GHz frequency band.

The Windows CE based computer 120, in response to PXE requests, provides a net boot program (NBP) and address information of a boot server to the requesting target servers. In the illustrated embodiment, the address information of the boot server 130 is an Internet Protocol (IP) address over the network. The NBP is a small, executable program that directs the server to the boot server. The NBP is typically a vendor provided program for the PXE software written in accordance with the PXE specification. An example of the NBP is described in more detail in the next paragraph. Also, in the illustrated embodiment, the boot image 140 may be provided through a router 125, by wireless communication, or through other techniques. In the illustrated embodiment, the boot image 140 comprises responses to PXE queries for the target server requesting a boot image. The Windows CE based computer 120 is capable of listening to one or more target servers at the same time. If the target servers do not have the PXE enablement turned on, the Windows CE based computer 120 preferably ignores any broadcasts from those servers. In step 25, the target server 110 executes the net boot program and by executing that program it requests, the boot server 130 to transfer a boot image 140 for that particular target server using standard routing. This allows a single or reduced number of boot servers to service multiple subnetworks. In this advantageous technique, the target server 110 receives the NBP from the Windows CE based computer 120 in response to its broadcast. By executing the NBP, the target server 110 can obtain the boot image 140 from a centralized boot server 130.

FIG. 1B is a flowchart of an example Compaq NBP 30 for using with the Windows CE based computer 120 for a Compaq system, such as any model of Compaq iPAQ 3100 and 3600 family, Compaq iPAQ 3700 family, and Compaq iPAQ 3800 family, according to a disclosed embodiment. In step 35, the NBP 30 issues a boot server request and the process waits for a response with up to four retries following a time out. In step 40, the Windows CE based computer 120 receives the boot server information. This information includes boot server name and/or its IP address, which could be different from the IP address of the Windows CE based computer 120, and the boot file name from the returned packet. In step 45, using the IP address of the boot server 130 and the boot image name, the Windows CE based computer 120 issues a Trivial File Transfer Protocol (TFTP) request for that boot image. The Boot Information Packet (BINL) requests, from the Windows CE based computer 120, the IP address and the NBP that it should download from the boot server. In step 50, the TFTP downloads the boot image where the content of the boot image is an image of the bootable floppy 140 (1.44 or 2.88 MB in size). Once this floppy has been downloaded it is placed into high memory of a server 110. In one embodiment, the boot file size is 16 MB, and this insures that the Low memory is available for program usage after the Boot Strap process is initiated.

In step 55, the NBP can hook the DOS interrupts for Disk I/O, and the DOS interrupts for reading floppy drive (int 13h) are such that all request to read from the floppy drive are redirected to be read from the Bootfile image located in high memory. This means that any int 13h calls that are generated will go first to the Windows CE based computer code and not the standard ROM BIOS routine. In step 60, the NBP relocates the Master boot record from the downloaded boot file to 7C00H location using int 13h. Any other requests are forwarded on to the standard int 13h routine. In step 65, the available memory is determined in view of the size of the NBP and a memory location is assigned. The master boot record is copied to 7c00h in the memory. This is the standard boot mechanism. In step 70, the control jumps to the location 7c00h of the master boot record where the booting process using the boot file starts and the NBP execution is terminated. This process of PXE booting repeats several times as required by the script that configures the server. The state information is kept such that after each reboot the system re-enters the script at the appropriate place until booting is complete. It will be appreciated that the technique is but one example, and other boot images, scripts, and processing can be employed.

Figure 2:
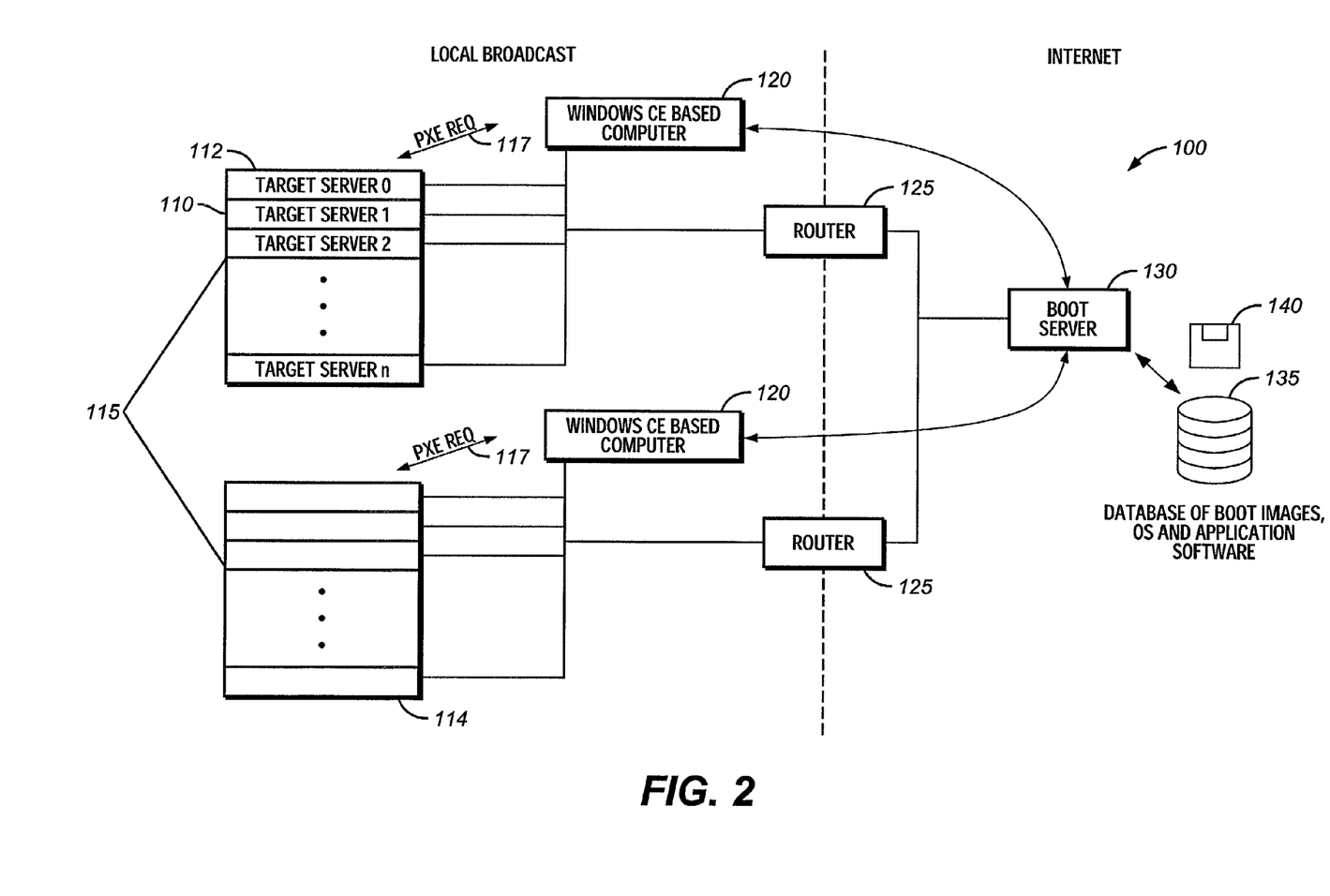
FIG. 2 is a diagram of a system of booting servers on a network using a Windows CE based computer.

Execution of the net boot program provides server communication with the boot server 130 to whom the server 110 identifies itself by its IP address and in response an associated boot image 140 is provided to the requesting target server. Typically, the boot server 130 stores a database of boot images, operating systems, and application software on a storage medium, for example a hard drive 135. In one embodiment of the technique 10, the boot server 130 stores boot images specific to each target server 110 and links a specific boot image to a specific target server's 110 ID. The boot images 140 corresponding to each target server 110 may comprise a script specific to the requesting target server. Thus, when the boot server 130 receives a request from a particular target server 110, the boot server 130 looks in its database and links a particular boot image to that server's ID and transfers that boot image to the target server 110. Typically, a boot image 140 also may comprise code to install at least one operating system on a requesting server, for example, Windows NT or Linux. In this manner, even headless servers, i.e. having no CD, floppy or hard drive, can be booted and provided with the desired operating system and application software. The boot image 140 may also contain code for a certain desired application software, for example, word processing, email, Internet access, etc.

In one embodiment, a net boot program can be stored in a "read-only" type memory (i.e., Flash memory) of the target server, and subsequently executed out of that read-only memory in the target server 110. When the boot image 140 is transferred from the boot server 130 in response to executing the net boot program, the boot image 140 is transferred using a trivial file transfer protocol (TFTP) that is part of the PXE services. Thus, the target server 110 receives a booting script through execution of which it also receives operating software, application software like TFTP, and any other applications that are included in the script. An example of a simple Compaq-specific boot script with self explanatory comments is provided herein. In the example script, the first step is to check the current state of the server configuration process. This information is kept on the server in nonvolatile RAM. Some steps in the boot script require computer reboots between successive steps to allow the ROM to incorporate the change before allowing additional configuration steps. After each reboot, the PXE process is repeated and the boot image is downloaded and the process picks up at the same point. The example boot script is arranged in four phases based on the state process. The four phases in this example accomplish following aspects of the booting process:

Phase 1
 1. Configure the System Hardware (mother board)
 2. Configure the Array controller(s) if any are present
 3. Set the state to the next phase
 4. Reboot Phase 2
 1. Create a boot partition and Special partition (optional)
 2. Set the state to the next phase
 3. Reboot Phase 3
 1. Format and populate the boot and special partition(s) as required by the OS installation
 2. Set special partition type to hidden (if there is one)
 3. Set the state to the next phase
 4. Launch The OS install using unattended script capabilities of The OS installer.

Phase 4
 1. Complete OS installation by updating Compaq drivers
 2. Launch any other application installation processes as indicated by customers internal build requirements.

In another embodiment, the boot server provides the same boot image to every requesting target server 110. However, the boot image 140 comprises an inside script within a main script. The main script has the common responses for each target server. The other script within the main script has responses and other actions specific to various target servers. Each target server 110 is capable of recognizing information specific to it from the inside script and executes that specific information. This embodiment is advantageous because the boot server 130 provides the same boot image to every requesting target server 110.

Figure 3:
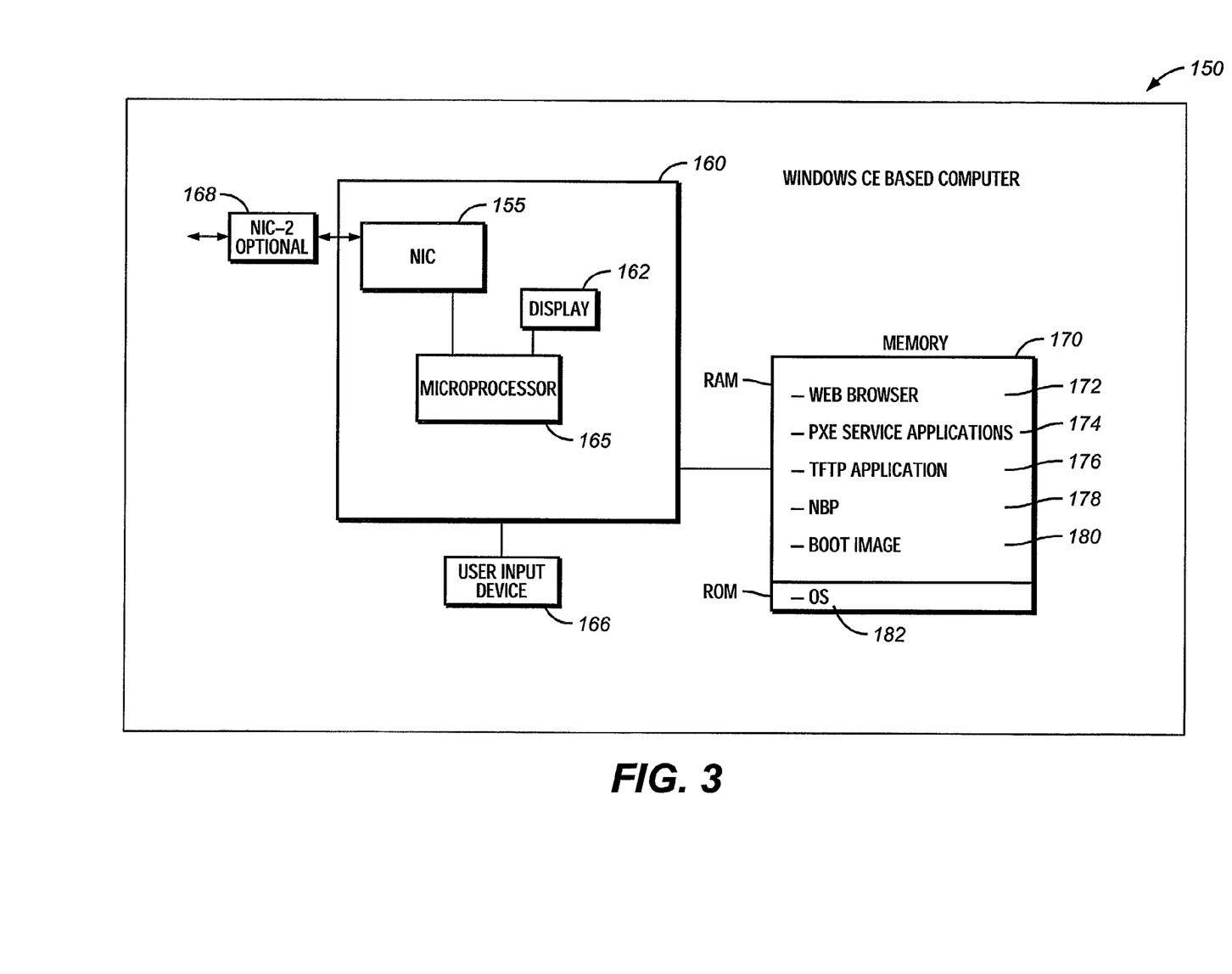
FIG. 3 is an example embodiment of a Windows CE based computer.

With reference to FIG. 3, an embodiment of a prebooting execution environment Windows CE based computer 150 (Windows CE based computer) is illustrated. In the illustrated embodiment, a microcomputer 160 has a NIC 155 coupled to a processor 165, and the processor is coupled to a display 162. The display 162, for example in one embodiment, is a 240×320 pixel display with 4096 colors, and a user input device 166, for example, a pen input device. An optional NIC-2 168 can be provided to enhance wireless communication capabilities, and possibly add additional memory to optionally store other NBPs in the computer. The Windows CE based computer 150 is provided with minimum hardware and software so that when a target server requests booting, the Windows CE based computer 150 provides enough services to direct the requesting server to the boot server 130. The processor 165 executes preboot execution environment routing software that can perform the following functions: listen to the PXE requests 117 from the PXE enabled target servers 110 of subnets 112 and 114 of the computer network 115; and in response to the PXE request from the requesting server 110, provide a network boot program and address information of a boot server 130 to the requesting server 110. This embodiment of the Windows CE based computer 120 provides minimal services, whereas the boot server 130 can provide a maximum amount of services that are included by a particular installation. This embodiment has several advantages. For example, when the installation implements an operating system change, or other system changes, there is no need to implement the changes to the Windows CE based computers on an installation wide basis, unlike in the Intel PXE server architecture wherein each PXE server will require corresponding changes implemented therein. Moreover, integrity of the services through one boot server is easily maintained to provide reliable server booting.

The Windows CE based computer 150 is provided with a memory 170 coupled to the microprocessor 165. The memory 170 may be RAM, Flash memory, other available forms of memory or combinations thereof. In one embodiment, using a Compaq iPaq model 3670, the memory 170 is 64 Mb RAM and 64 Mb Flash memory. In this embodiment, the operating system Windows CE is stored in ROM 182. The ROM 182 size is 16 Mb. The memory 170 may have a web browser 172, PXE service applications 174, a TFTP application 176, a network boot program 178, and a boot image 180. In this embodiment, the Windows CE based computer may retain a boot image 180 that was received from the boot server and subsequently provide the boot image ISO to many different requesting servers as needed, for example, when many servers in a sequence may be requesting the same boot image 180, the Windows CE based computer 150 may be readily able to provide that stored boot image 180. However, when another server, for example, requests a different boot image, the process outlined above is used, and that particular boot image may be retained in the Windows CE based computer 150 for repeated usage, until a request for a new boot image is received. The Windows CE based computer 150 can be configured remotely through the web browser 172. This is advantageous in updating any Windows CE based computer software and updating any changed or new IP addresses of the boot server 130. An advantage of the Windows CE based computer illustrated here is that an Information Technology (IT) specialist may edit server parameters and make other desired configuration changes while in the field, e.g. being in the proximity of the servers, for example while making hardware upgrades to a server, or while being away from the servers and access to the Internet is not available. A person of ordinary skill will be able to use other known models of the Windows CE based computers or similar configurations and the noted programming to make a computer similar to Windows CE based computer illustrated herein.

With reference to FIG. 2, a system 100 for booting a computer network 115 is illustrated. A target network 115 of PXE enabled servers has subnetworks, for example subnetwork 112 and subnetwork 114, wherein each of the subnetworks is coupled to a corresponding Windows CE based computer 120. The Windows CE based computer 120 listens to the PXE requests from servers in the target network 115 and answers with a net boot program and an IP address of a boot server 130 to the requesting target server. A boot server 130 is coupled to the Windows CE based computer through an IP socket communication or wireless communication for requesting images or other necessary configuration data. The boot server 130 may be coupled to the network through routers 125.

The boot server 130 may be coupled to the network 115 without a router as well. As noted above, the Windows CE based computer 120 is preferably configurable through the web browser 172 or may be configured manually, whether the IT specialist is in the field, at the server site, or in the office. This functionality can be advantageously utilized in configuring the system 100 as well.

Figure 4:
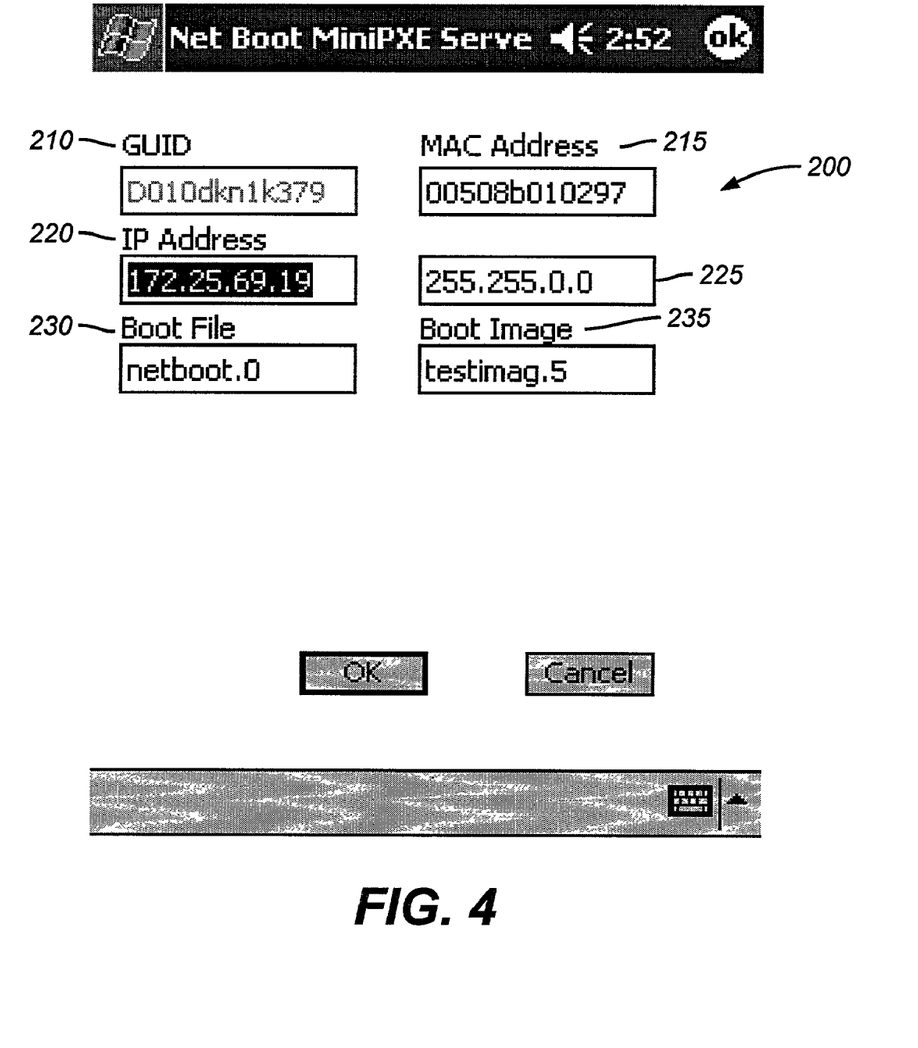
FIG. 4 is an example of a client edit box of the user interface of the Windows CE based computer in FIG. 3.

With reference to FIG. 4, an example of a client edit box 200 of the user interface of a hand held Windows CE based computer of FIG. 3 is shown. The user interface allows the user to configure different aspects of the network, like handling the PXE listening process events, updating information in the event log, and other aspects of user interface events using the Windows CE based computer. The GUID (Globally Unique ID) 210 is typically the computer manufacturer's computer serial number or any other unique identifier. The GUID 210 is synonymous with the well known acronym UUID (Universally Unique ID). The Windows CE based computer assigns a MAC (Media Access Control) address 215 to the computer having Id in the GUID 210 box. The IP address 220 of the computer is provided by the IT person. A network mask 225 is set to limit communication of the computer with the other devices in the network. Boot file 230 shows the name of the NBP for the computer having its Id in the GUID 210 box. The Boot image 235 shows the name of the boot image floppy that is downloaded and corresponds to the boot file 230.

Figure 5:
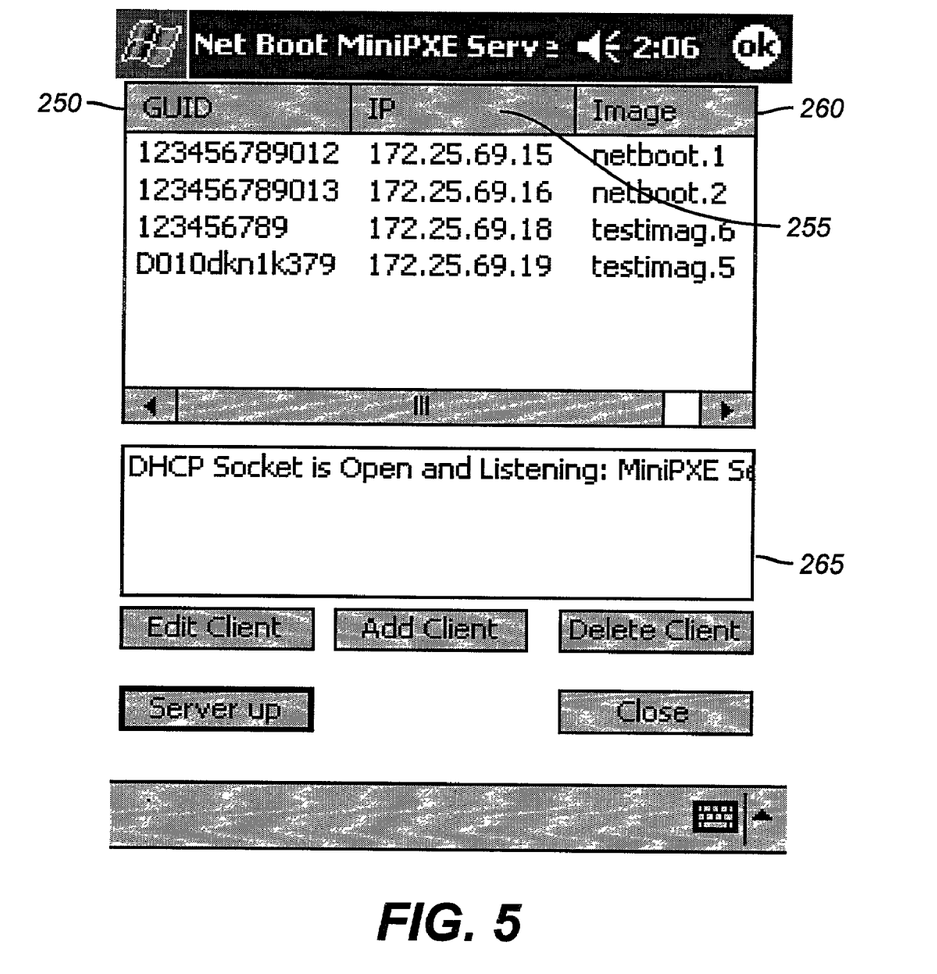
FIG. 5 is an example of a real-time display of the PXE console server on the user interface of the Windows CE based computer in FIG. 3.

FIG. 5 is an example of a real-time display 260 of the PXE console server on the user interface 200 of the Windows CE based computer of FIG. 3. The real-time display 260 shows a list of computers' GUIDs 250, corresponding IP addresses 255 and the corresponding boot images 260 for the computers on the network. A PXE status box 265 shows, in the example display 260, status of the DHCP socket or other relevant information. In the example real-time display the IT person can edit client information, add new clients, and delete clients. The example display 265 also shows status of the Windows CE based computer that the server is up. Similar real-time displays may be utilized to display other useful parameters. In another display, for example, the IP address of the Windows CE based PXE server 120, its' IP address Mask, IP address of the boot server 130, and the default boot image for a new target server that may be coming online, if any, may be displayed. In yet another display, a TFTP server screen for sending and receiving new files related parameters, for example, boot images 140, the Net boot program, and system definitions from outside sources, like another Windows CE based PXE server, may be displayed.

The foregoing disclosure and description of the preferred embodiment are illustrative and explanatory thereof, and various changes in the components, circuit elements, circuit configurations, and signal connections, as well as in the details of the illustrated circuitry and construction and technique of operation may be made without departing from the spirit and scope of the invention.

Example Boot script:

```
@ECHO OFF
CLS
REM ***
-----------------------------------------------------------------
REM *** Ensure that the shared network directory is used and get
REM *** the current state
REM ***
-----------------------------------------------------------------
S:
CD \CPQ
ECHO Retrieving State Information...
S:\CPQ\STATEMGR /r PHASE
REM ***
-----------------------------------------------------------------
REM *** Remove this initial pause when the batch file has been full tested
REM *** and debugged
REM ***
-----------------------------------------------------------------
REM ***
-----------------------------------------------------------------
REM *** Establish DOS error levels and branching in declining order
REM ***
-----------------------------------------------------------------
IF ERRORLEVEL 10 GOTO State10
IF ERRORLEVEL 9 GOTO State9
IF ERRORLEVEL 8 GOTO State8
IF ERRORLEVEL 7 GOTO State7
IF ERRORLEVEL 6 GOTO State6
IF ERRORLEVEL 5 GOTO State5
IF ERRORLEVEL 4 GOTO State4
IF ERRORLEVEL 3 GOTO State3
IF ERRORLEVEL 2 GOTO State2
```

-continued

```
IF ERRORLEVEL 1 GOTO State1
IF ERRORLEVEL 0 GOTO State0
:State0
REM ***
-----------------------------------------------------------------
REM *** First state
REM *** Configure the target server hardware by reading the configuration
REM *** information in the script file S:\SERVER\DL380\DL380NT.HWR
REM *** Increment the state variable
REM ***
-----------------------------------------------------------------
ECHO Running Configuration Replication Utility...
S:\CPQ\CONREP -1 S:\DL380\SYSTEM.DAT
ECHO Setting State Information...
S:\CPQ\STATEMGR /w Phase 1
REM ----- Second State Configure Array ---------
:State1
REM ***
-----------------------------------------------------------------
REM *** Second State
REM *** Configure the array controllers by reading the configuration
REM *** information in the script file S:\SERVERS\DL380\DL380NT.ARY and
REM *** stamping it onto the array controllers of the target server
REM *** Increment the state variable and reboot
REM ***
-----------------------------------------------------------------
ECHO Configuring the Array Controllers...
S:\CPQ\ACR /I S:\DL380\ARRAY.INI /o
echo Setting State Information...
ECHO Setting State Information...
S:\CPQ\STATEMGR /w Phase 2
REM ***
-----------------------------------------------------------------
REM *** Reboot to drive A:
REM ***
-----------------------------------------------------------------
S:\CPQ\BOOT a:
:State2
REM ***
-----------------------------------------------------------------
REM *** Third state
REM *** Create partition by reading content of the
REM *** S:\SERVERS\DL380\DL380NT.PRT script file and stamping the
REM *** configuration onto the hard drive in the target server
REM *** Prepare for system partition population
REM *** Increment state variable and reboot
REM ***
-----------------------------------------------------------------
ECHO Creating Disk Partition...
S:\CPQ\CPQDISK /w S:\DL380/DISKPART.INI
S:\CPQ\SYSPART /update: enable
ECHO Setting State Information...
S:\CPQ\STATEMGR /w Phase 3
REM ***
-----------------------------------------------------------------
REM *** Reboot to drive A:
REM ***
-----------------------------------------------------------------
S:\CPQ\BOOT a:
:State3
REM ***
-----------------------------------------------------------------
REM *** Fourth State
REM *** Populate the syatem partition
REM *** Increment the state variable and reboot
REM ***
-----------------------------------------------------------------
ECHO Populating System Partition...
S:\CPQ\SYSPART /update: disable
C:\
CD\
S:\CPQ\PSYSPART /s:S:
ECHO Setting State Information...
S:\CPQ\STATEMGR /w Phase 4
REM ***
-----------------------------------------------------------------
REM *** Before this reboot, the system partition is C: and the DOS partition
REM *** is D: If you want to remove this reboot, use D: instead of C: when
REM *** referring to the DOS partition until a reboot is done
```

-continued

```
REM *** Reboot to drive A:
REM ***
-----------------------------------------------------------------
S:\CPQ\BOOT a:
:State4
REM ***
-----------------------------------------------------------------
REM *** Fifth State
REM *** Format the boot partition and populate
REM *** Increment the state variable
REM ***
-----------------------------------------------------------------
ECHO Formatting the First Disk Partition as DOS...
S:\CPQ\CPQFMT C:
C:
CD \
ECHO Create Driver Directory and Copy Drivers...
MKDIR $OEM$
S:
```

I claim:

1. A method of directing a computer network for booting using an embedded operating system (OS) based computer, the method comprising:
   listening with an embedded OS based computer to PXE requests from a plurality of PXE enabled target servers of a computer network; and
   providing from the embedded OS based computer to one of the plurality of PXE enabled target servers a netboot program and address information of a boot server responsive to a PXE request from the one of the PXE enabled target servers.

2. The method as in claim 1, wherein the computer network comprises a plurality of subnetworks of PXE enabled target servers.

3. The method as in claim 2, wherein the embedded OS based computer listens to one of the subnetworks.

4. The method as in claim 3, wherein the embedded OS based computer listens to one of the subnetworks by wireless communication.

5. The method as in claim 1, wherein the embedded OS is Windows CE operating system.

6. The method as in claim 1, wherein the plurality of PXE enabled target servers are part of a subnetwork of the computer network.

7. The method as in claim 1, wherein the listening step is performed through a TCP/IP stack.

8. The method as in claim 1, wherein the address information of the boot server comprises an IP address.

9. The method as in claim 1, further comprising transferring a boot image from the boot server responsive to the netboot program executing on the one of the PXE enabled target servers, the boot image containing code to install at least one of an operating system and application software in the one of the PXE enabled target servers.

10. The method as in claim 9, wherein the boot image is provided through a router.

11. The method as in claim 9, wherein the boot image is provided by wireless communication.

12. The method as in claim 9, wherein the boot image comprises responses to preboot execution environment queries.

13. The method as in claim 9, wherein the boot image further comprises a script specific to the requesting target server.

14. The method as in claim 9, wherein the netboot program is executed out of a read-only memory.

15. The method as in claim 9, wherein the boot image is transferred using a trivial file transfer protocol.

16. The method as in claim 9, wherein the one of the PXE enabled target servers is booted by executing the boot image.

17. The method as in claim 1, further comprising displaying address information for the plurality of PXE enabled target servers.

18. The method as in claim 1, further comprising displaying a plurality of boot images for the plurality of PXE enabled target servers.

19. The method as in claim 1, further comprising displaying PXE requests for the plurality of PXE enabled target servers.

20. An embedded OS based computer for network booting under preboot execution environment (PXE) control, the computer comprising:
   a network interface controller (NIC);
   an embedded operating system (OS) to control the NIC;
   a processor coupled to the NIC;
   a processor executable PXE routing software, which is adapted to perform the processor executable steps of:
      listening to PXE requests from a plurality of PXE enabled target servers of computer network; and
      providing to one of the plurality of PXE enabled target servers a netboot program and address information of a boot server separate from the embedded OS based computer, in response to a PXE request from the one of the PXE enabled target servers.

21. The embedded OS based computer as in claim 20, further comprising a display coupled to the processor.

22. The embedded OS based computer as in claim 20, further comprising an input device coupled to the processor.

23. The embedded OS based computer as in claim 20, further comprising a memory coupled to the processor.

24. The embedded OS based computer as in claim 23, wherein the memory further comprises:
   a web browser;
   PXE service applications;
   a TFTP application;
   the netboot program; and
   a boot image.

25. The embedded OS based computer as in claim 24, wherein the embedded OS based computer is configured through the web browser.

26. The embedded OS based computer as in claim 23, wherein the embedded OS based computer is configured directly.

27. The method of claim 1, wherein providing the netboot program from the embedded OS based computer comprises providing the netboot program from the embedded OS based computer that is separate from the boot server.

28. The method of claim 27, wherein providing the netboot program to the one of the PXE enabled target servers comprises providing the netboot program that when executed causes the one of the PXE enabled target servers to issue a request to the boot server for a boot image to download to the one of the PXE enabled target servers.

29. The method of claim 28, further comprising:
receiving, by the embedded OS based computer, the request to the boot server; and
in response to the request, send, by the embedded OS based computer, a Trivial File Transfer Protocol (TFTP) request to the boot server for the boot image.

30. The embedded OS based computer of claim 20, wherein the netboot program when executed causes the one of the PXE enabled target servers to issue a request to the boot server for a boot image.

31. The embedded OS based computer of claim 30, wherein the boot image comprises a script that includes code to install an operating system on the one of the PXE enabled target servers.

32. The embedded OS based computer of claim 20, comprising a handheld computer.

33. The embedded OS based computer of claim 20, wherein the embedded OS comprises a Windows CE OS.

34. The embedded OS based computer of claim 20, further comprising a display to display address information for the plurality of PXE enabled target servers.

35. An article comprising a storage containing software that when executed causes an embedded operating system (OS) based computer to:
receive a request from a target server for remote booting of the target server; and
in response to the request, send a program and address information of a boot server to the target server, wherein the boot server is separate from the embedded operating system (OS) based computer,
wherein the program when executed causes the target server to issue a boot server request to the boot server for a boot image to download to the target server, the boot image containing code to install at least one of an operating system and application software on the target server.

36. The article of claim 35, wherein the software when executed causes the embedded operating system (OS) based computer to further:
receive the boot server request; and
in response to the boot server request, issue a Trivial File Transfer Protocol (TFTP) request to the boot server for the boot image.

37. The article of claim 35, wherein the embedded operating system (OS) based computer comprises a handheld computer.

38. The article of claim 35, wherein the embedded operating system (OS) based computer receives the request from the target server by wireless communications.

39. The article of claim 35, wherein the received request from the target server comprises a preboot execution environment (PXE) request, the target server being a PXE enabled target server.

40. A computer comprising:
a processor;
an embedded operating system (OS) executable on the processor;
software executable on the processor to:
receive a request from a target server; and
in response to the request, send information to the target server to direct the target server to a boot server separate from the computer for downloading a boot image from the boot server to the target server for remote booting of the target server,
wherein the information sent to the target server comprises a netboot program and an address of the boot server,
wherein the computer is a reduced-capability computer having less capability than a server computer.

41. The computer of claim 40, wherein the embedded OS comprises a Windows CE OS.

42. The computer of claim 40, further comprising a wireless interface to receive the request wirelessly.

43. The computer of claim 40, wherein the received request comprises a preboot execution environment (PXE) request.

44. The computer of claim 40, further comprising a display to display address information for plural target servers, and to list boot images for the plural target servers, the software executable on the processor to:
listen to requests from the plural target servers for remote booting of the target servers.

* * * * *

UNITED STATES PATENT AND TRADEMARK OFFICE
CERTIFICATE OF CORRECTION

PATENT NO.         : 7,085,921 B2
APPLICATION NO. : 10/039049
DATED              : August 1, 2006
INVENTOR(S)        : James F. Frye, Jr.

Page 1 of 1

It is certified that error appears in the above-identified patent and that said Letters Patent is hereby corrected as shown below:

In column 1, line 31, delete "Intelts" and insert -- Intel's --, therefor.

In column 12, line 46, in Claim 20, after "servers of" insert -- a --.

Signed and Sealed this

Seventeenth Day of February, 2009

JOHN DOLL
*Acting Director of the United States Patent and Trademark Office*